United States Patent
Mironets et al.

(10) Patent No.: US 9,976,486 B2
(45) Date of Patent: May 22, 2018

(54) FLOW DEVICES AND METHODS OF MAKING THE SAME

(71) Applicant: Delavan Inc, West Des Moines, IA (US)

(72) Inventors: Sergey Mironets, Charlotte, NC (US); Matthew Donovan, Ankeny, IA (US)

(73) Assignee: Delavan Inc., Des Moines, IA (US)

( * ) Notice: Subject to any disclaimer, the term of this patent is extended or adjusted under 35 U.S.C. 154(b) by 49 days.

(21) Appl. No.: 14/749,791

(22) Filed: Jun. 25, 2015

(65) Prior Publication Data
US 2016/0376996 A1    Dec. 29, 2016

(51) Int. Cl.
| | | |
|---|---|---|
| *B22D 23/06* | (2006.01) | |
| *B22D 25/00* | (2006.01) | |
| *F02C 7/22* | (2006.01) | |
| *B33Y 80/00* | (2015.01) | |
| *B33Y 99/00* | (2015.01) | |
| *B28B 1/00* | (2006.01) | |

(52) U.S. Cl.
CPC ............... *F02C 7/22* (2013.01); *B22D 23/06* (2013.01); *B22D 25/00* (2013.01); *B33Y 80/00* (2014.12); *B33Y 99/00* (2014.12); *B28B 1/001* (2013.01)

(58) Field of Classification Search
CPC ..... F02C 7/236; Y10T 29/4932; B33Y 99/00; B33Y 80/00; B22D 23/006; B28B 1/001; B23P 15/008; B23P 15/00; B23K 1/0018; B23K 1/001; B23K 1/04; B23K 1/02; B23K 1/026
USPC ........................... 228/193, 194, 248.1, 248.5
See application file for complete search history.

(56) References Cited

U.S. PATENT DOCUMENTS

| | | | |
|---|---|---|---|
| 6,042,780 A | 3/2000 | Huang | |
| 8,506,836 B2 | 8/2013 | Szuromi et al. | |
| 9,174,312 B2 * | 11/2015 | Baughman | ........... B23K 1/0018 |
| 2012/0222306 A1 | 9/2012 | Mittendorf et al. | |
| 2015/0001093 A1 | 1/2015 | Carter et al. | |
| 2015/0060403 A1 * | 3/2015 | Carter | ....................... F02C 7/30 216/53 |
| 2015/0239046 A1 * | 8/2015 | McMahan | ............... B32B 15/01 428/548 |
| 2015/0290707 A1 * | 10/2015 | Xu | ......................... B22D 23/06 264/497 |

* cited by examiner

*Primary Examiner* — Jason L Vaughan
*Assistant Examiner* — Amanda Meneghini
(74) *Attorney, Agent, or Firm* — Locke Lord LLP; Daniel J. Fiorello; Scott D. Wofsy

(57) ABSTRACT

A method for producing a device having at least one internal feature includes manufacturing an internal volume of the internal features out of a first material, disposing the internal volume in a parent material that has a higher melting point than the first material, causing the internal volume to melt within the parent material, and allowing at least a portion of the first material to diffuse into the parent material, thereby leaving behind the at least one internal feature within the parent material.

13 Claims, 4 Drawing Sheets

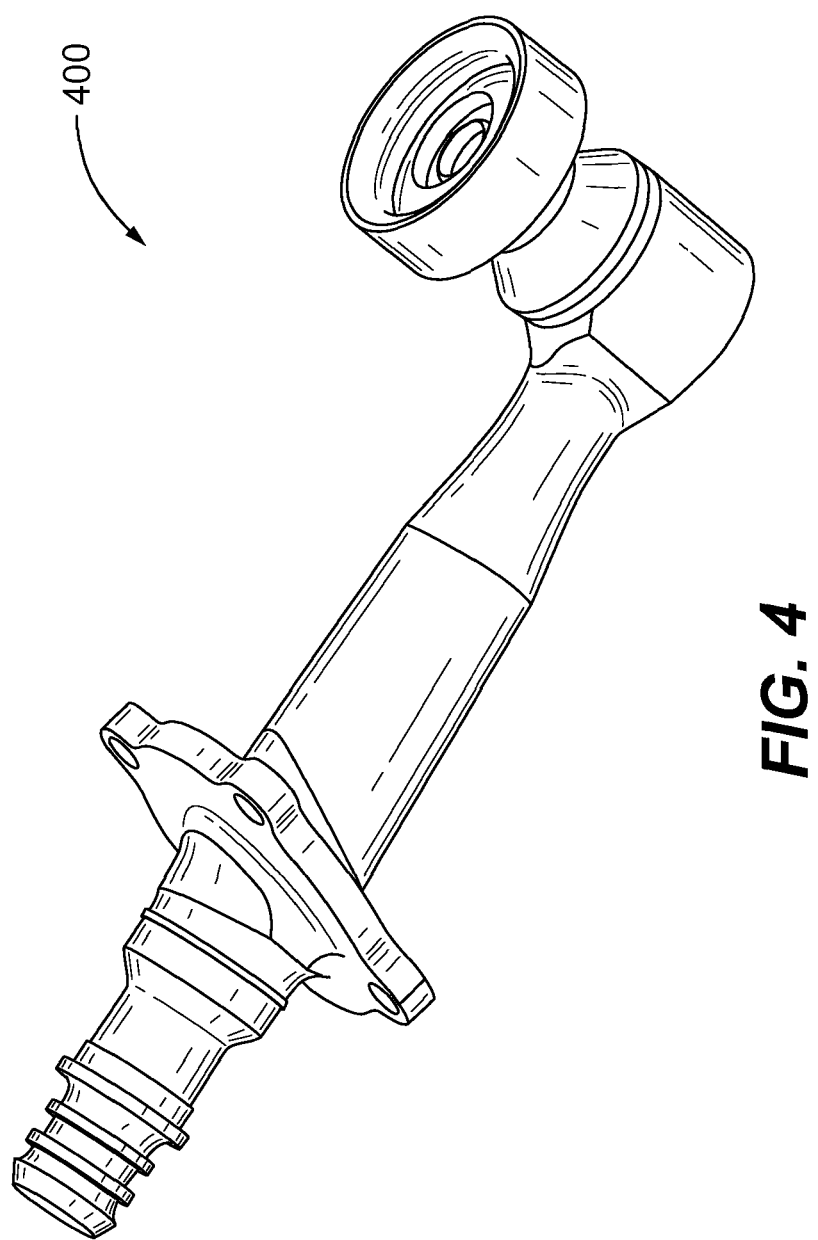

US 9,976,486 B2

FLOW DEVICES AND METHODS OF MAKING THE SAME

BACKGROUND

1. Field

The present disclosure relates to flow devices, more specifically to fuel nozzles and other flow devices including internal flow passages.

2. Description of Related Art

Certain flow devices having complex internal passages are additively manufactured. A downside of the existing methods for producing such flow devices (e.g., fuel nozzles) by means of additive manufacturing (e.g., Laser Powder Bed Fusion) is that internal passages are created with a poor surface finish. Surface asperities reduce metal fatigue properties and increase surface roughness which affects fuel flow uniformity. There are existing surface finishing techniques such as hydrohoning, electrochemical and magneto rheological processes, and their derivatives, however, such traditional surface finishing techniques are not effective for achieving the required surface finish of complex internal passages.

Such conventional methods and systems have generally been considered satisfactory for their intended purpose. However, there is still a need in the art for improved methods for manufacturing flow devices and flow devices with improved surface finish of internal flow passages. The present disclosure provides a solution for this need.

SUMMARY

A method for producing a device having at least one internal feature includes manufacturing an internal volume of the internal features out of a first material, disposing the internal volume in a parent material that has a higher melting point than the first material, causing the internal volume to melt within the parent material, and allowing at least a portion of the first material to diffuse into the parent material, thereby leaving behind the at least one internal feature within the parent material.

In certain embodiments, the internal feature can be a flow channel, the internal volume can be a flow volume, and the first material can be a channel material. However, any other suitable internal features, internal volumes, and/or first materials are contemplated herein.

Causing the flow volume to melt can include subjecting the channel material and the parent material to at least one of cold isostatic pressing or hot isostatic pressing. Manufacturing the flow volume can include additively manufacturing the flow volume.

The method can further include smoothing an exterior surface of the additively manufactured flow volume.

The parent material can include at least one desired diffusion characteristic to facilitate a desired diffusion of the channel material within the parent material. In certain embodiments, the parent material can include a powder.

The powder can include at least one of a metal powder, an alloy powder, a composite powder, or a ceramic powder. The method can further include fusing the powder together after or during melting the channel material within the powder.

The parent material can include at least one of a metal, metal alloy, a composite material, or a ceramic (powder or otherwise) and the channel material can include at least one of BNi-2, BNi-6, NB 30, NB 150, Bni-3, MBF-60, MBF-80, DF-3, Ni—Cr—B—Si, Haynes 230 doped with B, Al, Al+SiO$_2$, B$_2$O$_3$, or Oxynitride glass.

In certain embodiments, manufacturing the flow volume can include forming the flow volume such the flow channel defines at least part of a fuel flow circuit. The method can further include shaping the parent material into a fuel nozzle for a turbomachine.

In at least one aspect of this disclosure, a flow device can include a parent material defining a flow channel and a channel material diffused into the parent material through a wall that defines the flow channel. In certain embodiments, the channel material can be only partially diffused into the parent material from the flow channel such that there is a portion of the parent material that includes the channel material and a portion of the parent material that does not include the channel material.

A diffusion gradient can exist such that an amount of channel material becomes greater closer to the wall that defines the flow channel. The flow device can be a fuel nozzle and the flow channel is one or more fuel circuits.

In certain embodiments, the parent material can include at least one of a metal, metal alloy, a composite material, or a ceramic. The channel material can include at least one of BNi-2, BNi-6, NB 30, NB 150, Bni-3, MBF-60, MBF-80, DF-3, Ni—Cr—B—Si, Haynes 230 doped with B, Al, Al+SiO$_2$, B$_2$O$_3$, or Oxynitride glass or any other suitable material configured to have a lower melting point than the parent material. The wall that defines the flow channel can include a mirror finish.

In accordance with at least one aspect of this disclosure, a method for creating a smooth finish in a flow channel of an additively manufactured fuel nozzle can include manufacturing a three dimensional flow volume of the flow channel out of a channel material such that the flow volume includes a smooth outer surface, disposing the flow volume in a parent material, wherein the parent material that has a higher melting point than the channel material, causing the flow volume to melt within the parent material, and allowing at least a portion of the channel material to diffuse into the parent material, thereby leaving behind the flow channel within the parent material, wherein the flow channel includes a wall having a smoothness substantially similar to the smooth outer surface of the flow volume.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 4 is a perspective view of an embodiment of a fuel nozzle shaped from the parent material of FIG. 3.

DETAILED DESCRIPTION

Figure 1:
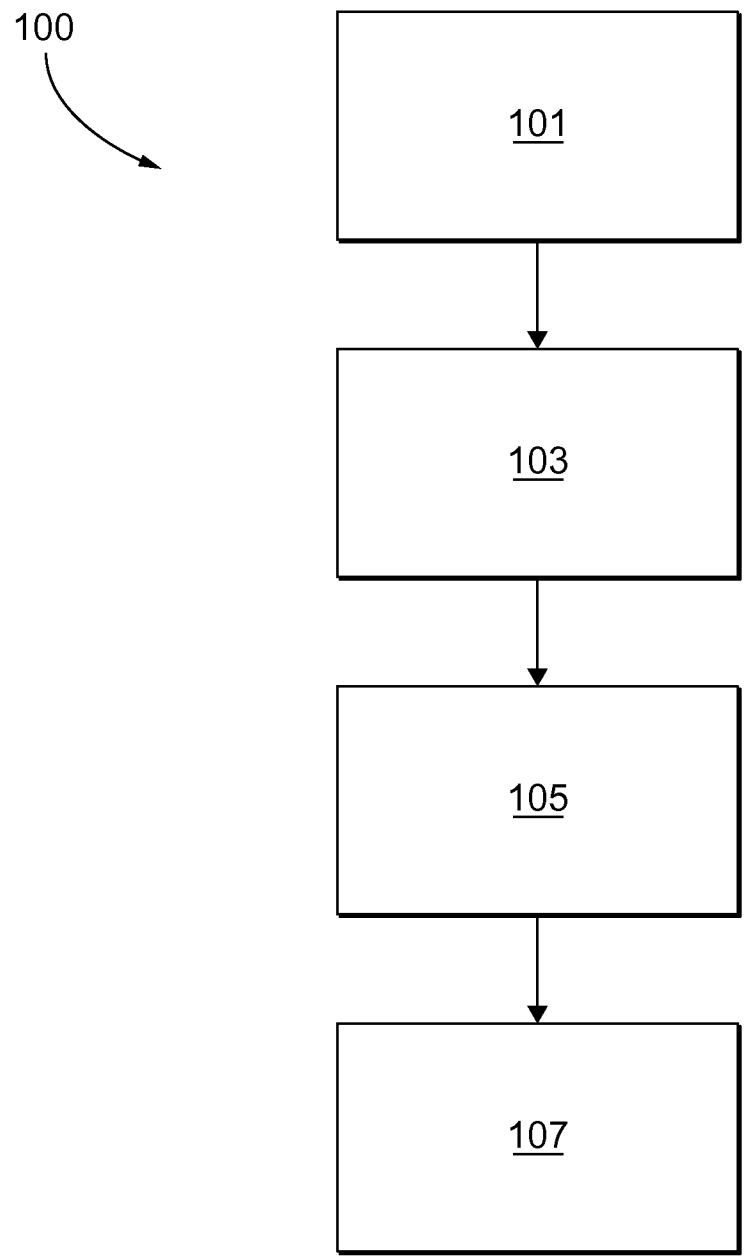
FIG. 1 is a block diagram of an embodiment of a method in accordance with this disclosure.
Figure 2:
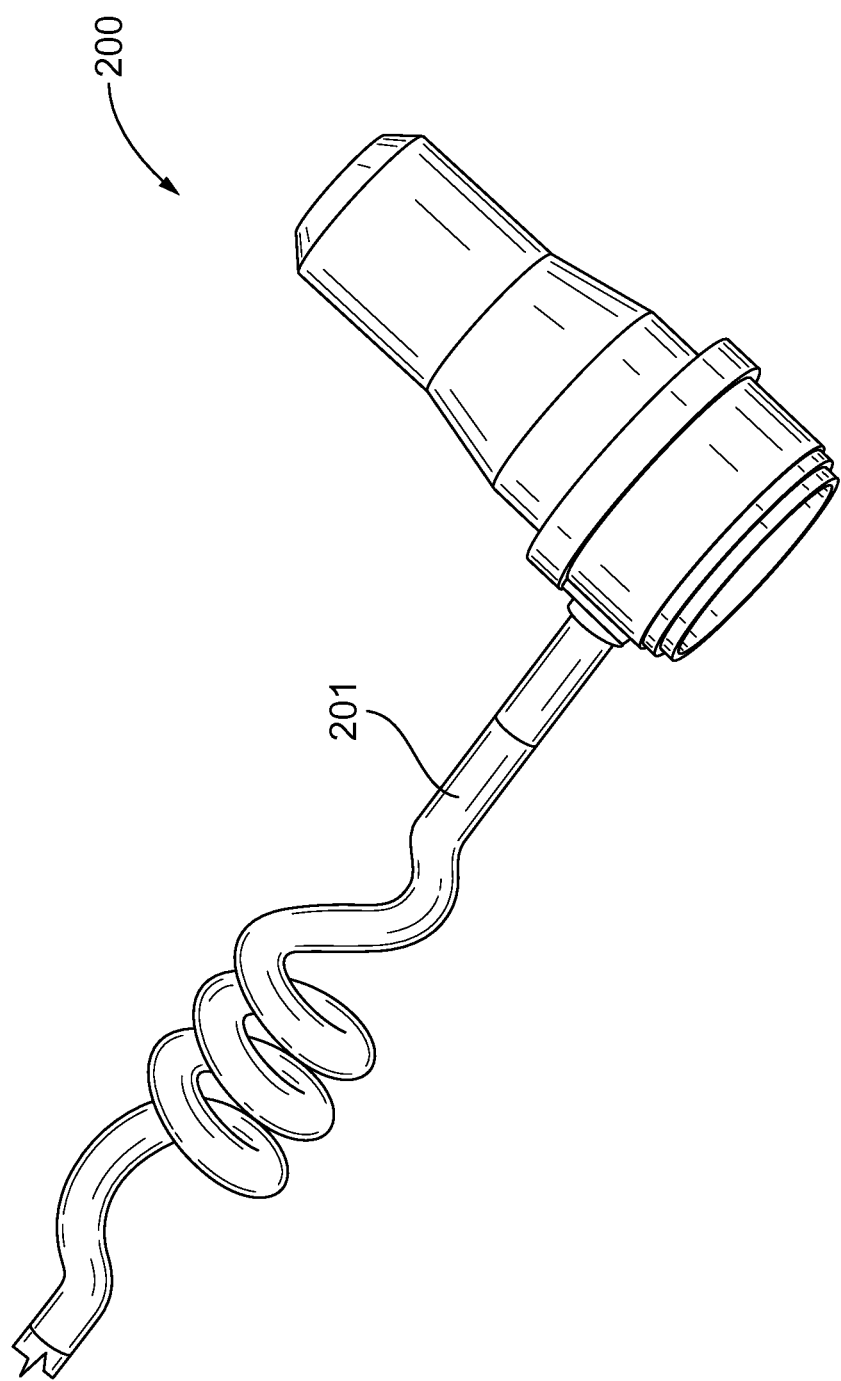
FIG. 2 is a perspective view of an embodiment of a flow volume in accordance with this disclosure.
Figure 3:
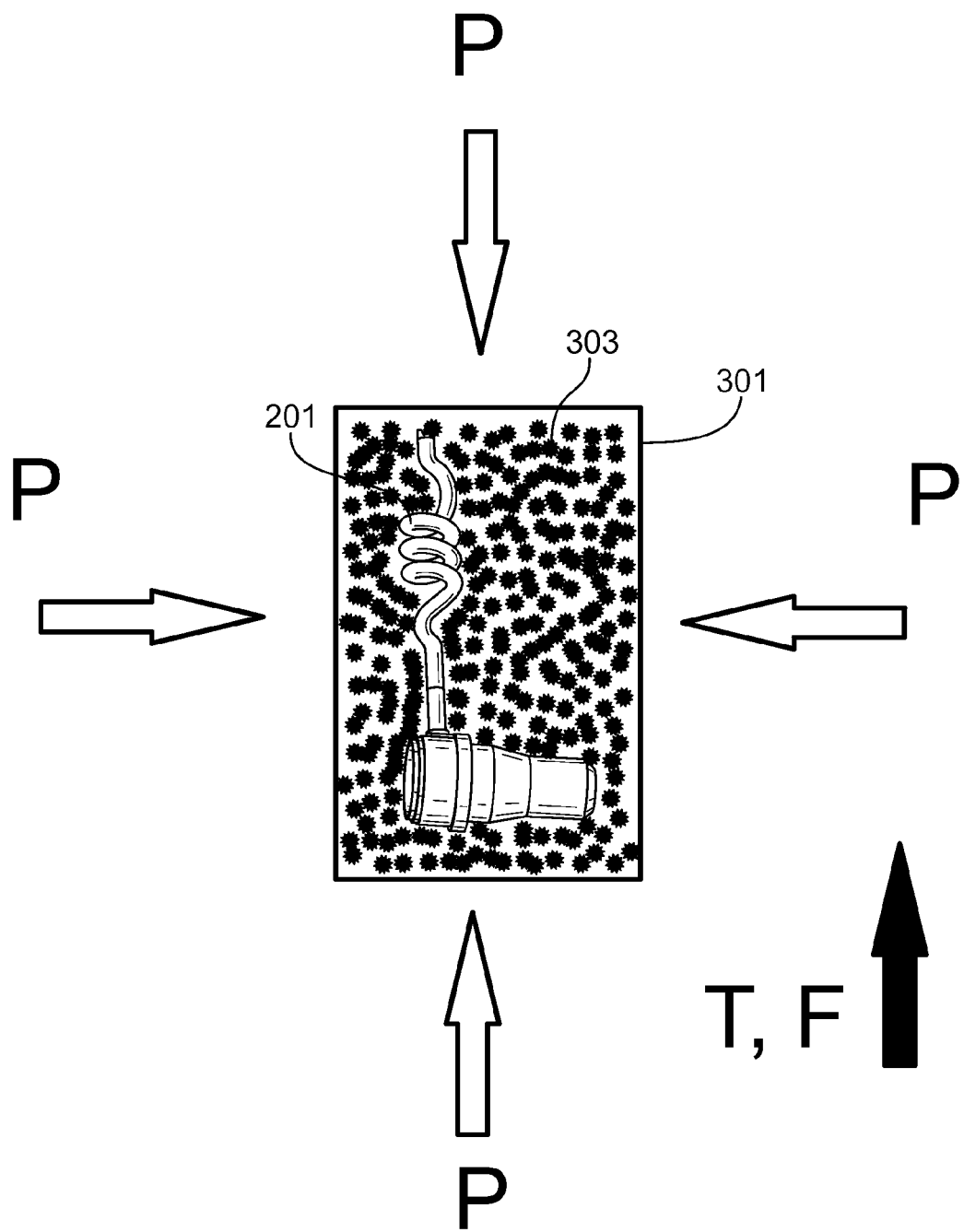
FIG. 3 is a cross-sectional view of an embodiment of a forming assembly, showing a flow volume made of a channel material disposed in a parent material within a container.

Reference will now be made to the drawings wherein like reference numerals identify similar structural features or aspects of the subject disclosure. For purposes of explanation and illustration, and not limitation, a block diagram of an embodiment of a method in accordance with the disclosure is shown in FIG. 1 and is designated generally by reference character 100. Other embodiments and/or aspects of this disclosure are shown in FIGS. 2-4. The systems and methods described herein can be used to additively manufacture flow devices with complex interior flow channels that are smooth.

A method for producing a device having at least one internal feature includes manufacturing an internal volume of the internal features out of a first material, disposing the internal volume in a parent material that has a higher melting point than the first material, causing the internal volume to melt within the parent material, and allowing at least a portion of the first material to diffuse into the parent material, thereby leaving behind the at least one internal feature within the parent material.

While the embodiments herein are described such that the internal feature is a flow channel, the internal volume is a flow volume, and the first material is a channel material, any other suitable internal features, internal volumes, and/or first materials are contemplated herein.

Referring to FIG. 1, a method 100 for producing a device having a flow channel defined therein includes, e.g., in block 101, manufacturing a flow volume (e.g., flow volume 200 as shown in FIG. 2) of the flow channel out of a channel material. The method 100 can also include, e.g., in block 103, selecting a parent material (e.g., parent material 303 shown disposed in a container 301 as shown in FIG. 3) that has a higher melting point than the channel material.

The parent material can be selected to have at least one desired diffusion characteristic to facilitate a desired diffusion of the channel material within the parent material. For example, the parent material can be selected to have a desired porosity, grain size, molecular structure, and/or any other suitable characteristic that affects diffusion of the channel material to the parent material.

In certain embodiments, the parent material can be selected to include a powder. The powder can include at least one of a metal powder, an alloy powder, a composite powder, or a ceramic powder. It is contemplated that the parent material can include a non-powder or any other suitable material.

Referring additionally to FIG. 2, manufacturing the flow volume 200 can include additively manufacturing the flow volume 200 (e.g., via laser sintering, material deposition, or any other suitable means). In certain embodiments, the method 100 can further include smoothing an exterior surface 201 of flow volume 200 (e.g., to remove roughness from additive manufacturing).

The channel material that makes up the flow volume 201 can include at least one of BNi-2, BNi-6, NB 30, NB 150, Bni-3, MBF-60, MBF-80, DF-3, Ni—Cr—B—Si, Haynes 230 doped with B, Al, Al+SiO$_2$, B$_2$O$_3$, or Oxynitride glass. However, it is contemplated that the flow volume 201 can be made of any suitable material (e.g., metal, plastic) that is configured to permeate into the parent material. In certain embodiments, the channel material can be selected as a function of the selected parent material, and vice versa.

The flow volume 200 can have any suitable shape and is the negative of at least part of a desired flow channel inside the flow device. In certain embodiments, manufacturing the flow volume 200 can include forming the flow volume 200 such the flow channel defines at least part of a fuel flow circuit.

Referring additionally to FIG. 3, the method 100 further includes, e.g., in block 105, disposing the flow volume (e.g., flow volume 200 as shown) in the parent material 303 (e.g., by placing the flow volume 201 in the container 301 and filling parent material 301 around the flow volume 201). The container 301 can include any suitable shape (e.g., a mold shape for a desired flow device). The parent material 303 can be consolidated to a suitable porosity after disposing the parent material 303 around the flow volume 201.

The method 100 can also include, e.g., in block 107, causing the flow volume (e.g., flow volume 200) to melt within the parent material 303 and allowing at least a portion of the channel material to diffuse into the parent material 303, thereby leaving behind the flow channel within the parent material 303.

Causing the flow volume (e.g., flow volume 200) to melt can include subjecting the channel material of the flow volume and the parent material 303 to at least one of cold isostatic pressing or hot isostatic pressing. For example, the parent material 303 having the flow volume 200 disposed therein can be subjected to increased temperature and/or pressure suitable to melt the channel material. Any other suitable method to melt the flow volume (e.g., flow volume 200) is contemplated herein.

The method 100 can further include fusing the parent material 303 together after or during melting the channel material within the parent material 303. This causes the parent material 303 to take a rigid shape defining the flow channels therein.

In certain embodiments, the channel material is only partially diffused into the parent material from the flow channel such that there is a portion of the parent material that includes the channel material and a portion of the parent material that does not include the channel material. In certain embodiments, a diffusion gradient can exist such that an amount of channel material becomes greater closer to the wall that defines the flow channel. In certain embodiments, the wall of the parent material that ultimately defines the flow channel can include a mirror finish or any other suitable smoothness.

The method 100 can further include shaping the parent material. For example, referring additionally to FIG. 4, the parent material 303 can be shaped (e.g., via at least one of milling, casting, subtractive manufacturing, and/or additive manufacturing) into a fuel nozzle 400 for a turbomachine after fusing the parent material 303 together.

Utilizing the methods above, a flow device can include improved surface finish of complex internal flow channels which can increase life of flow devices (e.g., fuel nozzles) and improve performance. The methods and systems of the present disclosure, as described above and shown in the drawings, provide for improved flow devices with superior properties including smooth complex interior flow channels. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for producing a device having at least one internal feature, comprising:
    manufacturing an internal volume of the at least one internal features out of a first material;
    disposing the internal volume in a parent material that has a higher melting point than the first material;
    causing the internal volume to melt within the parent material; and allowing at least a portion of the first material to diffuse into the parent material, thereby leaving behind the at least one internal feature within the parent material.

2. The method of claim 1, wherein the internal feature is a flow channel, the internal volume is a flow volume, and the first material is a channel material.

3. The method of claim 2, wherein causing the flow volume to melt includes subjecting the channel material and the parent material to at least one of cold isostatic pressing or hot isostatic pressing.

4. The method of claim 2, wherein manufacturing the flow volume includes additively manufacturing the flow volume.

5. The method of claim 4, further comprising smoothing an exterior surface of the additively manufactured flow volume.

6. The method of claim 2, wherein the parent material includes a powder.

7. The method of claim 6, wherein the powder includes at least one of a metal powder, an alloy powder, a composite powder, or a ceramic powder.

8. The method of claim 7, further comprising fusing the powder together after or during melting the channel material within the powder.

9. The method of claim 2, wherein the parent material includes at least one of a metal, metal alloy, a composite material, or a ceramic.

10. The method of claim 9, wherein the channel material can include at least one of BNi-2, BNi-6, NB 30, NB 150, Bni-3, MBF-60, MBF-80, DF-3, Ni—Cr—B—Si, Haynes 230 doped with B, Al, Al+$SiO_2$, $B_2O_3$, or Oxynitride glass.

11. The method of claim 2, wherein manufacturing the flow volume includes forming the flow volume such the flow channel defines at least part of a fuel flow circuit.

12. The method of claim 11, further comprising shaping the parent material into a fuel nozzle for a turbomachine.

13. A method for creating a smooth finish in a flow channel of an additively manufactured fuel nozzle, comprising:

manufacturing a three dimensional flow volume of the flow channel out of a channel material such that the flow volume includes a smooth outer surface;

disposing the flow volume in a parent material, wherein the parent material that has a higher melting point than the channel material;

causing the flow volume to melt within the parent material; and allowing at least a portion of the channel material to diffuse into the parent material, thereby leaving behind the flow channel within the parent material, wherein the flow channel includes a wall having a smoothness substantially similar to the smooth outer surface of the flow volume.

* * * * *